US012633088B2

(12) United States Patent
Hofman et al.

(10) Patent No.: US 12,633,088 B2
(45) Date of Patent: May 19, 2026

(54) ADVERSARIAL PATCH DETECTION SYSTEM BASED ON EXTRACTED PROJECTION AREA OF AN INPUT IMAGE

(71) Applicants: Fujitsu Limited, Kawasaki (JP); B. G. NEGEV TECHNOLOGIES AND APPLICATIONS LTD., at Ben-Gurion University, Beer Sheva (IL)

(72) Inventors: Omer Hofman, Beer Sheva (IL); Amit Giloni, Beer Sheva (IL); Ikuya Morikawa, Kawasaki (JP); Toshiya Shimizu, Kawasaki (JP); Yuval Elovici, Beer Sheva (IL); Asaf Shabtai, Beer Sheva (IL)

(73) Assignees: Fujitsu Limited, Kawasaki (JP); B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 240 days.

(21) Appl. No.: 18/399,904

(22) Filed: Dec. 29, 2023

(65) Prior Publication Data

US 2024/0233328 A1      Jul. 11, 2024

(30) Foreign Application Priority Data

Jan. 11, 2023    (IL) .......................................... 299817

(51) Int. Cl.
G06K 9/00         (2022.01)
G06T 5/70         (2024.01)
(Continued)

(52) U.S. Cl.
CPC .............. G06V 10/764 (2022.01); G06T 5/70 (2024.01); G06T 5/73 (2024.01); G06V 10/25 (2022.01);
(Continued)

(58) Field of Classification Search
CPC ...... G06V 10/764; G06V 10/25; G06V 10/44; G06V 10/761; G06V 2201/07;
(Continued)

(56) References Cited

U.S. PATENT DOCUMENTS

2022/0374526 A1*  11/2022  Pandey ................. G06F 21/577
2024/0242496 A1*   7/2024  Beach .................. G06V 10/774

OTHER PUBLICATIONS

Israeli Office Action issued Apr. 8, 2025 in corresponding Israeli Patent Application No. 299817, 4 pages.
(Continued)

*Primary Examiner* — Gregory A Morse
*Assistant Examiner* — Owais Iqbal Memon
(74) *Attorney, Agent, or Firm* — XSENSUS LLP

(57)         ABSTRACT

An information processing apparatus extracts a projection area of an object from an input scene containing a projection of the object, specifies each of second areas that are included in the extracted projection area of the object and that are similar to a plurality of first areas representing a feature of each of labels in a feature space, outputs a first classification result based on each of the plurality of labels indicating a state in which a distribution of combinations of the specified second areas and the first areas that are associated with the second areas is closer than a predetermined threshold; and determines whether or not an adversarial patch is included in the object by comparing the first classification result with a second classification result that is a result of classification of the objects obtained by inputting the input scene to a predetermined object detection model.

8 Claims, 10 Drawing Sheets

(51) Int. Cl.

| | |
|---|---|
| *G06T 5/73* | (2024.01) |
| *G06V 10/25* | (2022.01) |
| *G06V 10/44* | (2022.01) |
| *G06V 10/74* | (2022.01) |
| *G06V 10/764* | (2022.01) |
| *H04N 5/74* | (2006.01) |

(52) U.S. Cl.
CPC ............ *G06V 10/44* (2022.01); *G06V 10/761* (2022.01); *H04N 5/74* (2013.01)

(58) Field of Classification Search
CPC .. G06V 20/95; G06V 10/7747; G06V 10/811; G06T 5/70; G06T 5/73; H04N 5/74; G06F 18/24147
See application file for complete search history.

(56) References Cited

OTHER PUBLICATIONS

Extended European Search Report issued Jun. 11, 2024 in corresponding European Patent Application No. 23218605.6, 9 pages.
Chong Xiang , et al: "DetectorGuard: Provably Securing Object Detectors against Localized Patch Hiding Attacks", arxiv.org, Cornell University Library, 201 Olin Library Cornell University Ithaca, NY 14853, Oct. 26, 2021 (Oct. 26, 2021), XP091065393.
Chong Xiang, et al: "PatchGuard++: Efficient Provable Attack Detection against Adversarial Patches" arxiv.org, Cornell University Library, 201 Olin Library Cornell University Ithaca, NY 14853, Apr. 26, 2021 (Apr. 26, 2021), XP081944238.
Abhijith Sharma, et al: "Adversarial Patch Attacks and Defences in Vision-Based Tasks: A Survey", arxiv.org, Cornell University Library, 201 Olin Library Cornell University Ithaca, NY 14853, Jun. 16, 2022 (Jun. 16, 2022), XP091252439.
Ji et al., "Adversarial YOLO: Defense Human Detection Patch Attacks via Detecting Adversarial Patches", arXiv:2103.08860v1, Mar. 16, 2021, 9 pages.
David G. Lowe, "Distinctive Image Features from Scale-Invariant Keypoints", Journal of Computer Vision, Jan. 5, 2004, pp. 1-28.
Jing et al., "Neural Style Transfer: A Review", arXiv:1705.04058v7, Oct. 30, 2018, pp. 1-25.

* cited by examiner

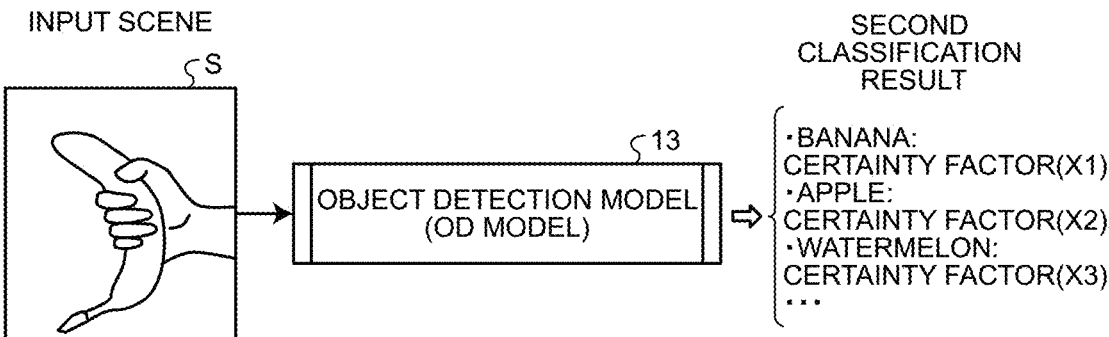

INPUT SCENE

S

OBJECT DETECTION MODEL
(OD MODEL)

13

SECOND
CLASSIFICATION
RESULT

·BANANA:
CERTAINTY FACTOR(X1)
·APPLE:
CERTAINTY FACTOR(X2)
·WATERMELON:
CERTAINTY FACTOR(X3)
· · ·

FIG.5

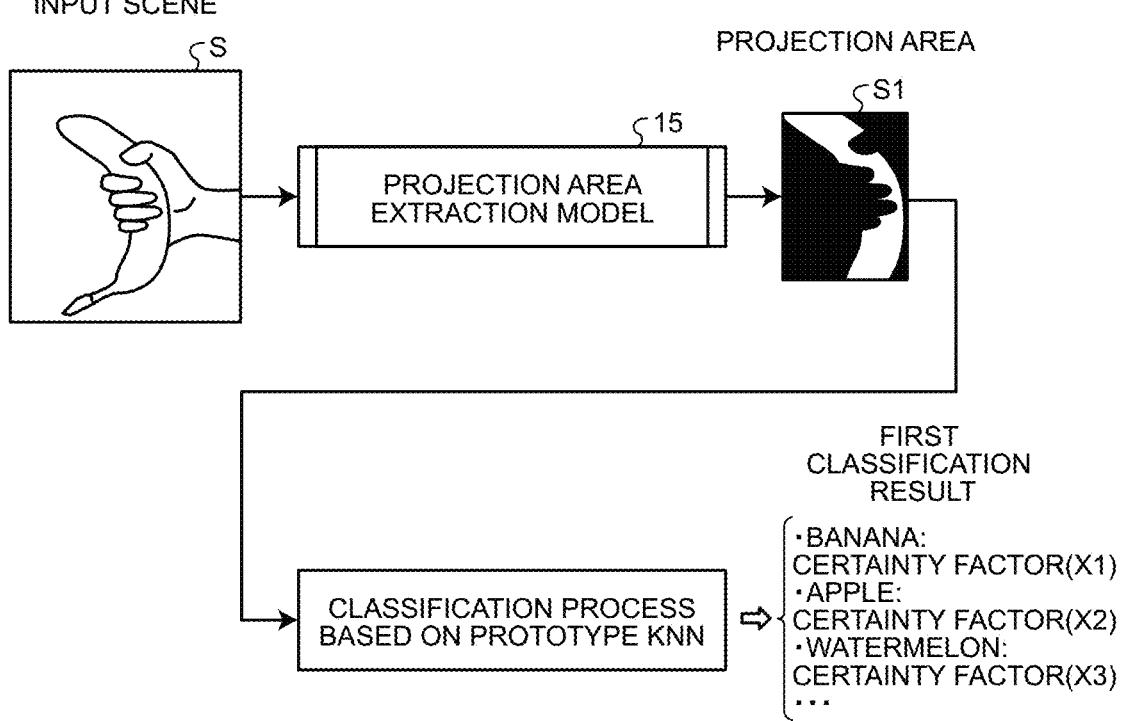

INPUT SCENE

S

PROJECTION AREA
EXTRACTION MODEL

15

PROJECTION AREA

S1

CLASSIFICATION PROCESS
BASED ON PROTOTYPE KNN

FIRST
CLASSIFICATION
RESULT

·BANANA:
CERTAINTY FACTOR(X1)
·APPLE:
CERTAINTY FACTOR(X2)
·WATERMELON:
CERTAINTY FACTOR(X3)
· · ·

FIG.6

ADVERSARIAL PATCH DETECTION SYSTEM BASED ON EXTRACTED PROJECTION AREA OF AN INPUT IMAGE

CROSS-REFERENCE TO RELATED APPLICATION

This application is based upon and claims the benefit of priority of the prior Israel Patent Application No. 299817, filed on Jan. 11, 2023, the entire contents of which are incorporated herein by reference.

FIELD

The embodiments discussed herein are related to a computer-readable recording medium, a determination method, and an information processing apparatus.

BACKGROUND

There is a known object detection model (object detector: OD) that outputs, in accordance with an input of image data, an area of an object imaged in the image data, information (label) on an object imaged in the image data, or the like. The object detection model is used in various fields, such as a retail field or a detection field of a suspicious person, to detect various objects in accordance with an input of an input scene that is an example of the image data. For example, an object detection model for specifying a product picked up by a user or a product purchased by a user in a retail store or the like, an object detection model for detecting a suspicious object at an airport, and the like are used.

In recent years, in object detection, an attack (patch attack) is carried out by allowing an adversarial patch to be included in a target scene and allowing a label that is different from the original label to be added, and there is a known technology for detecting a state in which the adversarial patch is included. For example, there is a technology for detecting whether or not an adversarial patch is present by using training data including the adversarial patch and performing a training such that the scene that includes therein the adversarial patch is classified into a new class (adversarial class) that indicates an occurrence of an attack.

Non Patent Literature 1: Ji, N.; Feng, Y.; Xie, H.; Xiang, X.; and Liu, "Adversarial YOLO: Defense Human Detection Patch Attacks via Detecting Adversarial Patches.", 2021, arXiv preprint arXiv: 2103. 08860.

Non Patent Literature 2: Lowe, D. G., "Distinctive image features from scale invariant key points.", 2004, International journal of computer vision, 60(2): 91-110.

Non Patent Literature 3: Jing, Y.; Yang, Y.; Feng, Z.; Ye, J.; Yu, Y.; and Song, M., "Neural style transfer: A review.", 2019, IEEE transactions on visualization and computer graphics, 26 (11): 3365-3385.

SUMMARY

According to an aspect of an embodiment, a non-transitory computer-readable recording medium stores therein a determination program that causes a computer to execute a process. The process includes extracting a projection area of an object by inputting an input scene containing a projection of the object to a predetermined projection area extraction model, specifying each of second areas that are included in the extracted projection area of the object and that are similar to a plurality of first areas representing a feature of each of labels in a feature space, outputting a first classification result by performing a first classification process for classifying the objects based on each of the plurality of labels indicating a state in which a distribution of combinations of the specified second areas and the first areas that are associated with the second areas is closer than a predetermined threshold, and determining whether or not an adversarial patch is included in the object by comparing the first classification result with respect to the input scene with a second classification result that is a result of classification of the objects obtained by inputting the input scene to a predetermined object detection model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an adversarial patch.

FIG. 4 is a diagram illustrating object detection.

FIG. 5 is a diagram illustrating an OED process.

FIG. 6 is a diagram illustrating each label in a feature space.

DESCRIPTION OF EMBODIMENTS

However, in the technology described above, there may be a possibility that detection of the adversarial patch is not effectively functioned. For example, as in a category of business in which new items are added to an inventory every day, in a case in which it is difficult to prepare training data containing an adversarial patch in various scenes in advance, there may be a possibility that an adversarial patch that is not included in the training data is not accurately detected.

Preferred embodiments will be explained with reference to accompanying drawings. Furthermore, the present embodiment is not limited by the embodiments. In addition, each of the embodiments can be used in any appropriate combination as long as they do not conflict with each other.

(a) First Embodiment

Overall Configuration

Figure 1:
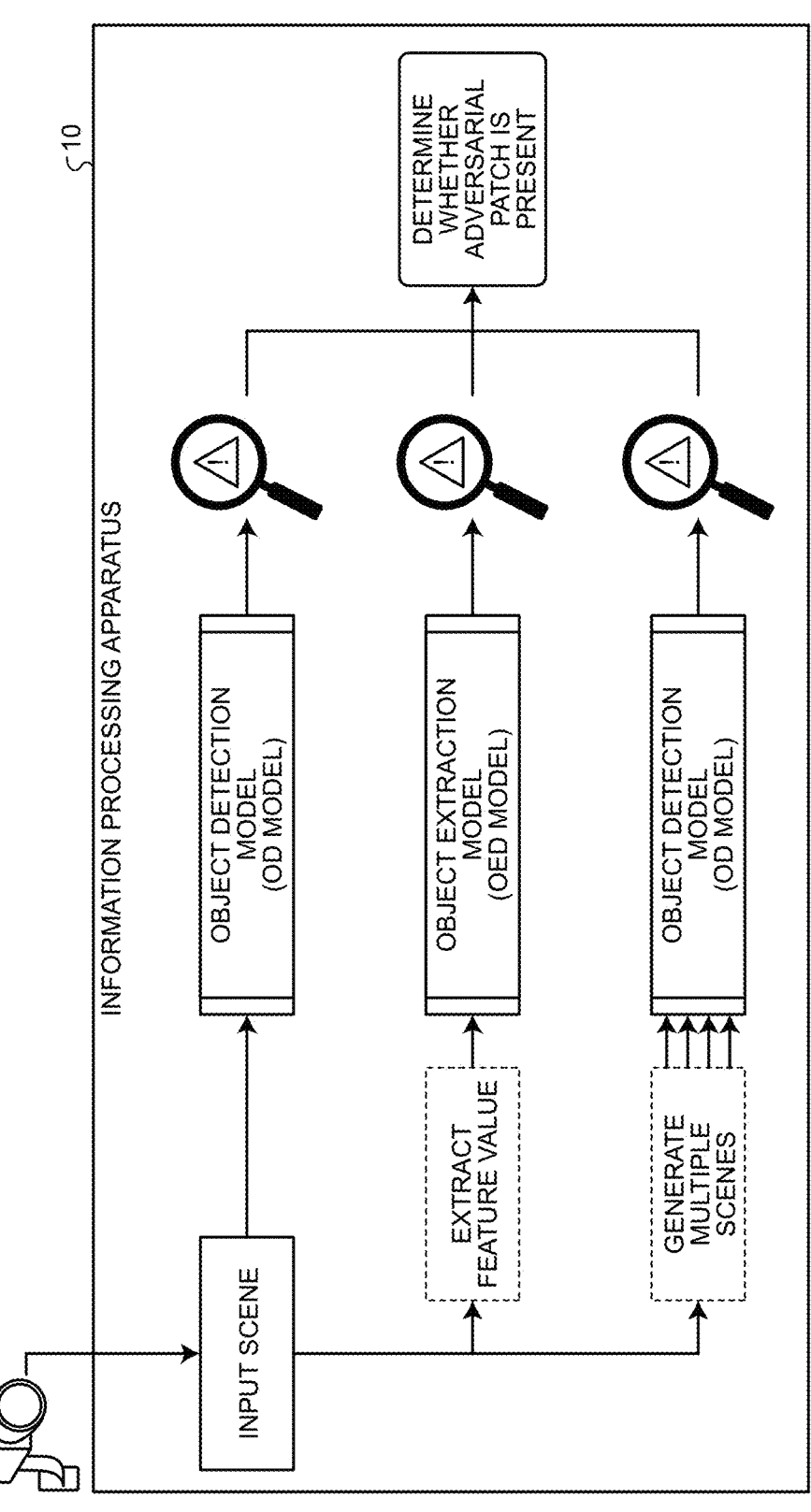
FIG. 1 is a diagram illustrating an information processing apparatus according to a first embodiment.

FIG. 1 is a diagram illustrating an information processing apparatus 10 according to a first embodiment. The information processing apparatus 10 illustrated in FIG. 1 is an example of a computer device that performs detection of an object included in an input scene that is an example of image data that has been captured in real time by using a camera or the like at various locations, such as a store or an airport, or pieces of image data that have been captured and accumulated. For example, the information processing apparatus 10 uses an object detection model (object detector (OD) model), and performs detection of a bounding box of a product that has been picked up or purchased by a user at a retail store or the like, detection of a bounding box of a suspicious object at an airport, and the like.

Figure 2:
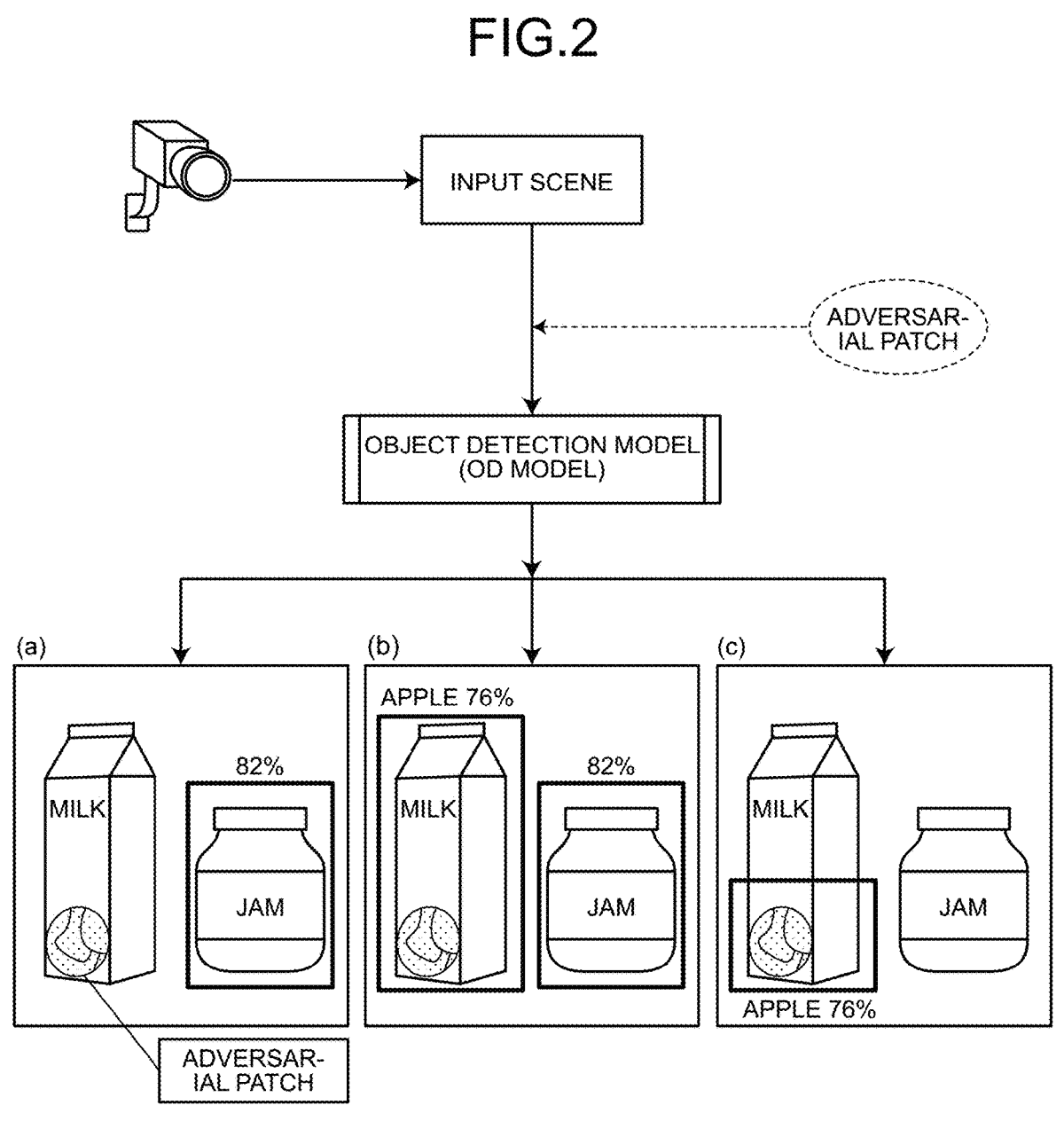

In recent years, there is a known fraudulent attack performed by adding an adversarial patch to an input scene that is input to an OD model and decreasing the detection accuracy of the OD model. FIG. 2 is a diagram illustrating an adversarial patch. FIG. 2 illustrates an example of a patch attack performed by locally adding an adversarial patch to an area of milk included in the input scene in which milk and jam are imaged and changing the image. As a result of an adversarial patch being added, for example, as indicated by (a) illustrated in FIG. 2, an event in which a bounding box of the milk is not detected and only the bounding box of the jam is detected occurs. Furthermore, as indicated by (b) illustrated in FIG. 2, an event in which both of an apple and jam are detected instead of the milk occurs; an event in which, as indicated by (c) illustrated in FIG. 2, the milk and the jam are not detected but an apple is detected instead of the milk on the basis of a part of the milk occurs, or the like occurs. In other words, as a result of an adversarial patch being added, erroneous detection of an OD model, an omission of detection, or the like occurs, and thus, detection accuracy of the OD model is decreased.

Accordingly, the information processing apparatus 10 according to the first embodiment uses an OED model (Object Extraction Detector: object extraction model) and a Scene Processing Detector (SPD), and performs determination whether or not an adversarial patch has been added to the input scene that is input to the OD model.

Specifically, as illustrated in FIG. 1, the information processing apparatus 10 inputs an input scene to an OD model (object detection model), and acquires an extraction result of the object. Concurrently, the information processing apparatus 10 extracts a feature value from the input scene, inputs the extracted feature value to an OED model (object extraction model), compares the feature value of the input scene with the feature value that has been extracted from another object in advance, and classifies the objects included in the input scene. Furthermore, the information processing apparatus 10 generates a plurality of scenes by performing various kinds of image processing, such as a blur processing, on the input scene, inputs the plurality of scenes to the OD model (object detection model), and acquires a classification result of the objects.

Then, the information processing apparatus 10 determines whether or not an adversarial patch is included in the input scene that has been input to the OD model by using, in combination, each of the extraction result obtained from the OD model performed with respect to the input scene, the classification result of the objects obtained from the OED model, and the classification result obtained from the OD model performed with respect to the plurality of scenes. Consequently, the information processing apparatus 10 is able to detect an adversarial patch without performing a training, in advance, including the adversarial patch.

Functional Configuration

Figure 3:
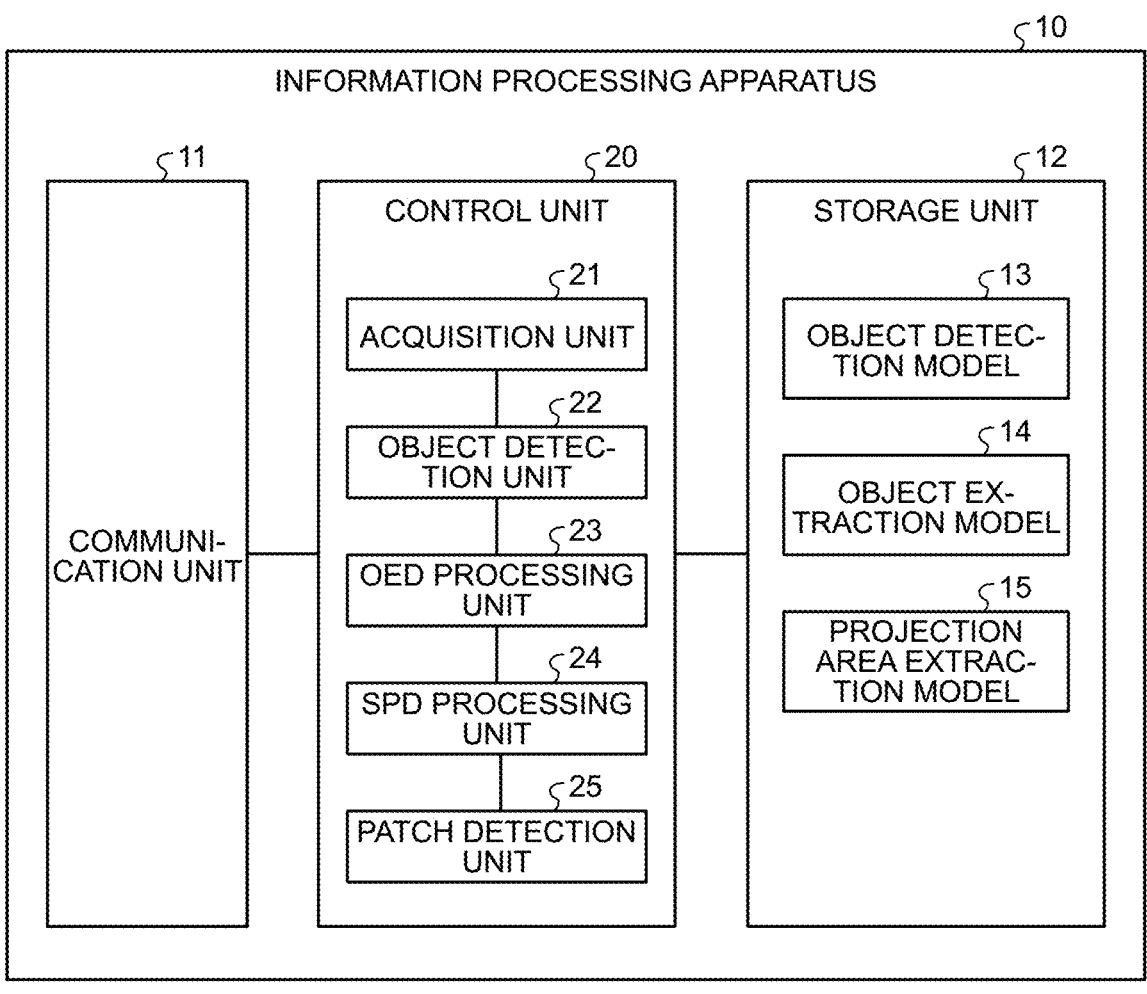
FIG. 3 is a functional block diagram illustrating a functional configuration of the information processing apparatus according to the first embodiment.

FIG. 3 is a functional block diagram illustrating a functional configuration of the information processing apparatus 10 according to the first embodiment. As illustrated in FIG. 3, the information processing apparatus 10 includes a communication unit 11, a storage unit 12, and a control unit 20.

The communication unit 11 is a processing unit that performs control of communication with another device and is implemented by, for example, a communication interface, or the like. For example, the communication unit 11 acquires an input scene that includes a projection of an object from a camera, or the like.

The storage unit 12 is a processing unit that stores therein various kinds of data, programs executed by the control unit 20, or the like and is implemented by, for example, a memory, a hard disk, or the like. The storage unit 12 stores therein an object detection model 13, an object extraction model 14, and a projection area extraction model 15.

The object detection model 13 is a machine learning model that outputs a detection result of an object in accordance with an input of the input scene in which a projection of the object is included. In other words, the object detection model 13 outputs a second classification result that is a result of classification of the objects from the input scene. The object detection model 13 is a trained machine learning model obtained by training parameters of the machine learning model by using training data in which an object name is used as a label (objective variable) and an input scene (input image data) is used as an explanatory variable. In other words, the object detection model 13 is not trained by using an adversarial patch for the training data.

The object extraction model 14 is a machine learning model that specifies and extracts an object included in an input scene in which a projection of the object is included, and that classifies the objects by using the extraction result and a prototype KNN (k-nearest neighbors). In other words, the object extraction model 14 outputs a first classification result that is a result of classification of the objects from the input scene. In other words, the object extraction model 14 is not trained by using an adversarial patch for the training data.

The projection area extraction model 15 is a machine learning model that extracts a projection area of an object in accordance with an input of an input scene in which a projection of the object is included. For example, the projection area extraction model 15 erases a background of the object included in the input scene as noise. The projection area extraction model 15 is a trained machine learning model obtained by training parameters of the machine learning model by using training data in which a removal result of noise is used as a label (objective variable) and an input scene (input image data) is used as an explanatory variable. In other words, the projection area extraction model 15 is not trained by using an adversarial patch for the training data.

The control unit 20 is a processing unit that manages the entire of the information processing apparatus and is implemented by, for example, a processor, or the like. The control unit 20 includes an acquisition unit 21, an object detection unit 22, an OED processing unit 23, a SPD processing unit 24, and a patch detection unit 25. Furthermore, the acquisition unit 21, the object detection unit 22, the OED processing unit 23, the SPD processing unit 24, and the patch detection unit 25 are implemented by an electronic circuit included in the processor, a process executed by the processor, or the like.

The acquisition unit 21 is a processing unit that acquires an input scene in which a projection of an object is included from a camera installed in a store or an airport. For example, the acquisition unit 21 acquires video data from the camera as needed, and stores the acquired video data in the storage unit 12. In addition, the data acquired by the acquisition unit 21 is video data or image data. A plurality of image frames are included in the video data in time series. A frame number is assigned to each of the image frames in an ascending order of time series. A single image frame is the image data of a still image captured by the camera at a certain timing. The input scene described above is an example of each of the image frames (each of the pieces of image data).

The object detection unit 22 is a processing unit that inputs an input scene to the object detection model (OD model) 13, and that detects an object. FIG. 4 is a diagram illustrating detection of the object. As illustrated in FIG. 4, the object detection unit 22 inputs an input scene S to the object detection model (OD model) 13, and acquires the second classification result including a certainty factor of each of the objects. The second classification result includes items of "object=banana, certainty factor=X1", "object=apple, certainty factor=X2", "object=watermelon, certainty factor=X3", and the like. In ordinary circumstances, an object having the highest certainty factor is selected.

The OED processing unit 23 is a processing unit that classifies the objects included in an input scene by using the feature values included in the input scene. Specifically, the OED processing unit 23 inputs an input scene in which a projection of an object is included to the projection area extraction model 15, and extracts a projection area of the object. Subsequently, the OED processing unit 23 specifies each of second areas that are included in the extracted projection area of the object and that are similar to a plurality of first areas representing a feature of each of the labels (each of the objects) in a feature space. After that, the OED processing unit 23 performs a first classification process for classifying the objects on the basis of each of a plurality of labels indicating a state in which a distribution of combinations of the specified second areas and the first areas that are associated with the second areas is closer than a predetermined threshold, and acquires the first classification result.

FIG. 5 is a diagram illustrating an OED process. As illustrated in FIG. 5, the OED processing unit 23 inputs the input scene S into the projection area extraction model 15, and extracts a projection area S1 that includes the object and in which the background of the object (a banana, in the case illustrated in FIG. 5) has been removed. Subsequently, the OED processing unit 23 generates feature values included in the projection area S1 of the object. Then, the OED processing unit 23 performs a classification process on the objects by using a prototype KNN that is a classifier.

In the following, the prototype KNN will be described. The prototype KNN is an example of a classifier obtained by using, in combination, a prototype choice and a KNN. The prototype choice mechanically or manually selects a prototype of the image data that is associated with a label. The prototype choice preferably includes multiple angles and lights with respect to a label. The KNN is an algorithm that determines a target label on the basis of labels of K samples that are closest with each other in the feature space, and is an example of an algorithm that does not need a learning process.

As the feature space, a key point of a prototype image is used. The key point is a local and small set of images suitably representing an object, and a single key point may be used for a single prototype image or a plurality of key points may be used for a single prototype image. In addition, the key point may be any point in the prototype image, or may be a point that is defined for each label or each prototype image in advance.

Figure 6:
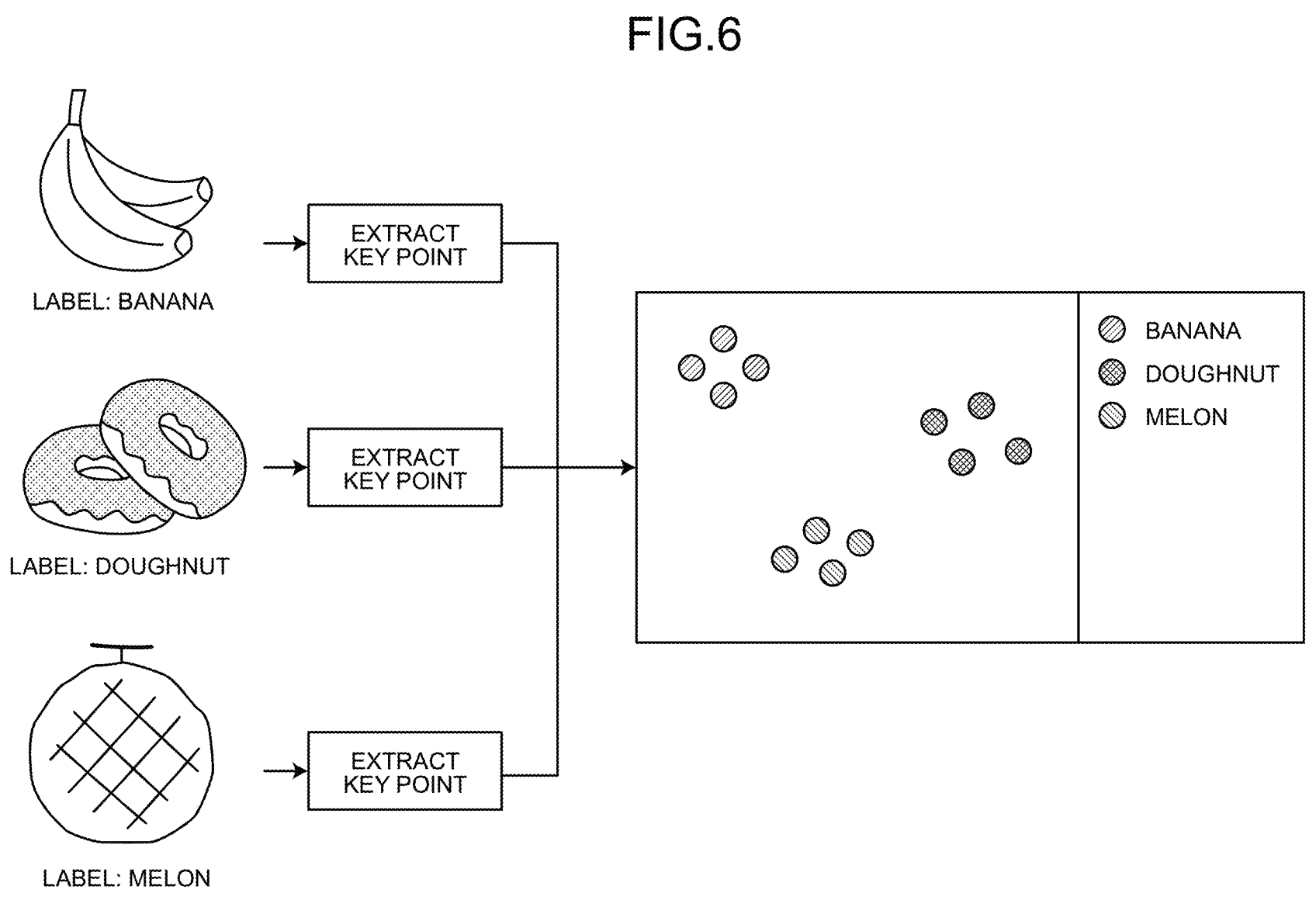

FIG. 6 is a diagram illustrating each of the labels included in the feature space. As illustrated in FIG. 6, the OED processing unit 23 detects each of the key points representing the feature of the banana from each of the pieces of image data on the label "banana", and maps the detected key points onto the feature space. Similarly, the OED processing unit 23 detects each of the key points representing the feature of the doughnut from each of the pieces of image data on the label "doughnut", and maps the detected key points onto the feature space; and detects each of the key points representing the feature of the melon from each of the pieces of image data on the label "melon", and maps the detected key points onto the feature space.

In this way, the OED processing unit 23 is able to project the feature value of each of the labels, that is, each of the objects targeted for the classification, onto the feature space. After that, the OED processing unit 23 maps the feature values of the objects extracted from the input scene onto the feature space, and classifies the objects.

Figure 7:
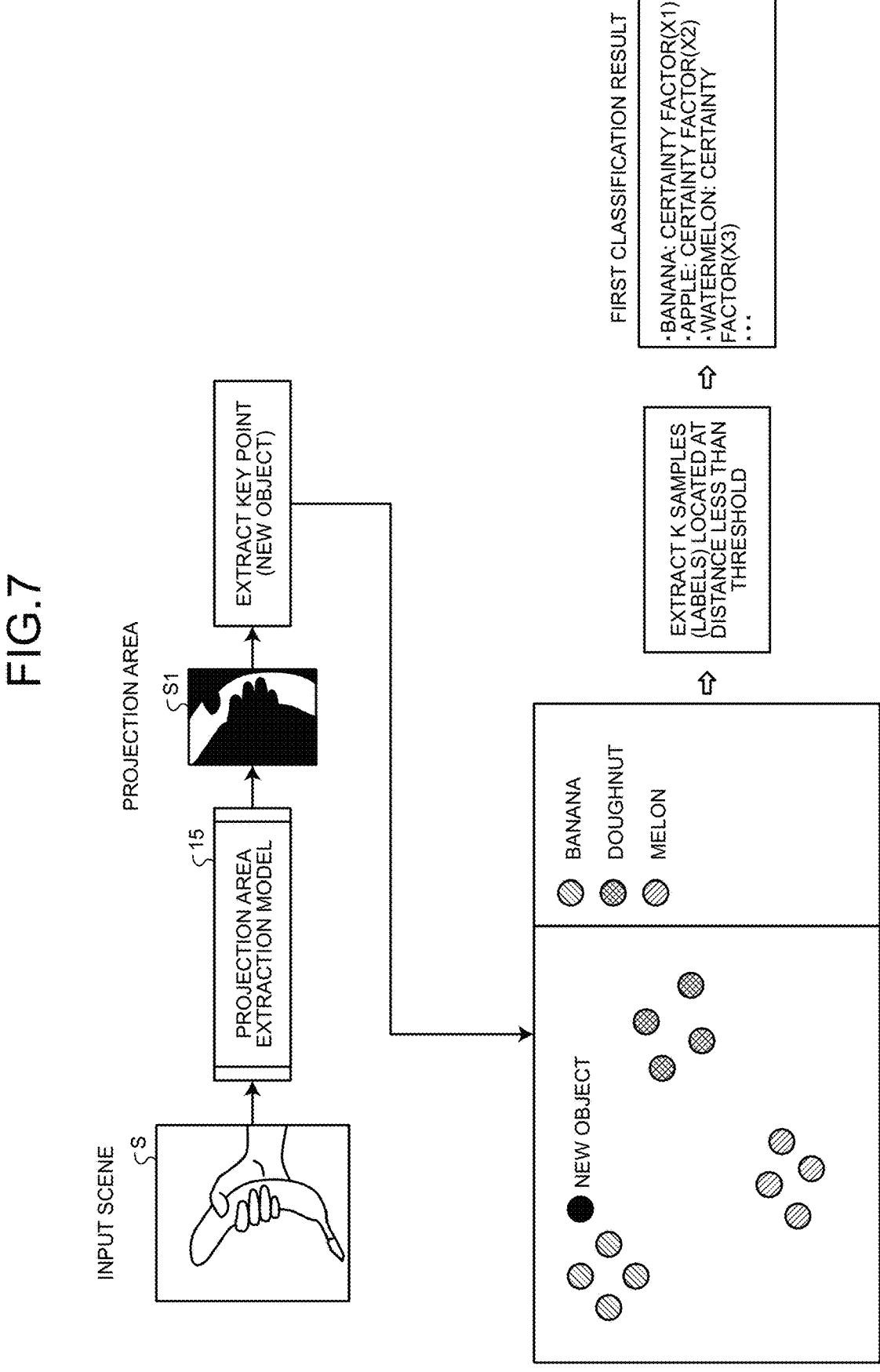
FIG. 7 is a diagram illustrating classification performed on the basis of a prototype KNN.

FIG. 7 is a diagram illustrating classification performed on the basis of the prototype KNN. As illustrated in FIG. 7, the OED processing unit 23 extracts a single or a plurality of key points from the projection area S1 that has been extracted from the input scene S. Subsequently, the OED processing unit 23 maps a key point (New Object) extracted from the projection area S1 onto the feature space described above with reference to FIG. 6. Then, the OED processing unit 23 extracts K samples (labels) (K is any number) located at a distance close to the key point (New Object). Here, K samples located at a distance close to the key point are, for example, the K samples located at a distance that is less than a threshold, the K samples that are located in the order in which a distance is smaller, or the like.

After that, the OED processing unit 23 generates the first classification result on the basis of the extracted K samples, and outputs the generated first classification result. Here, in the first classification result, a certainty factor of each of the labels (objects) is included.

Various methods may be used to calculate the certainty factor, and, in the following, an example thereof will be described. For example, the OED processing unit 23 determines a certainty factor on the basis of the ratio of the K samples that are included. To give an example, in the case where 50 samples of a banana are included out of 100 samples, the OED processing unit 23 defines the certainty factor of the banana as "0.5". In addition, the OED processing unit 23 determines the certainty factor on the basis of the number included in the K samples. To give an example, the certainty factor for each sample is defined as 0.01 and, in the case where five samples of a banana are included in 100 samples, the OED processing unit 23 defines the certainty factor of the banana as "0.05".

The SPD processing unit 24 is a processing unit that generates a plurality of scenes from an input scene, that inputs each of the plurality of scenes to the object detection model (OD model) 13, and that detects an object with respect to the input scene by using the detection result of the object with respect to each of the plurality of scenes.

Specifically, the SPD processing unit 24 performs different kinds of image processing on the input scene, and generates the plurality of scenes. The SPD processing unit 24 performs a SPD process (a second classification process) for classifying the objects included in the input scene on the basis of the result obtained by classifying and aggregating the plurality of generated scenes by using the object detection model 13.

Figure 8:
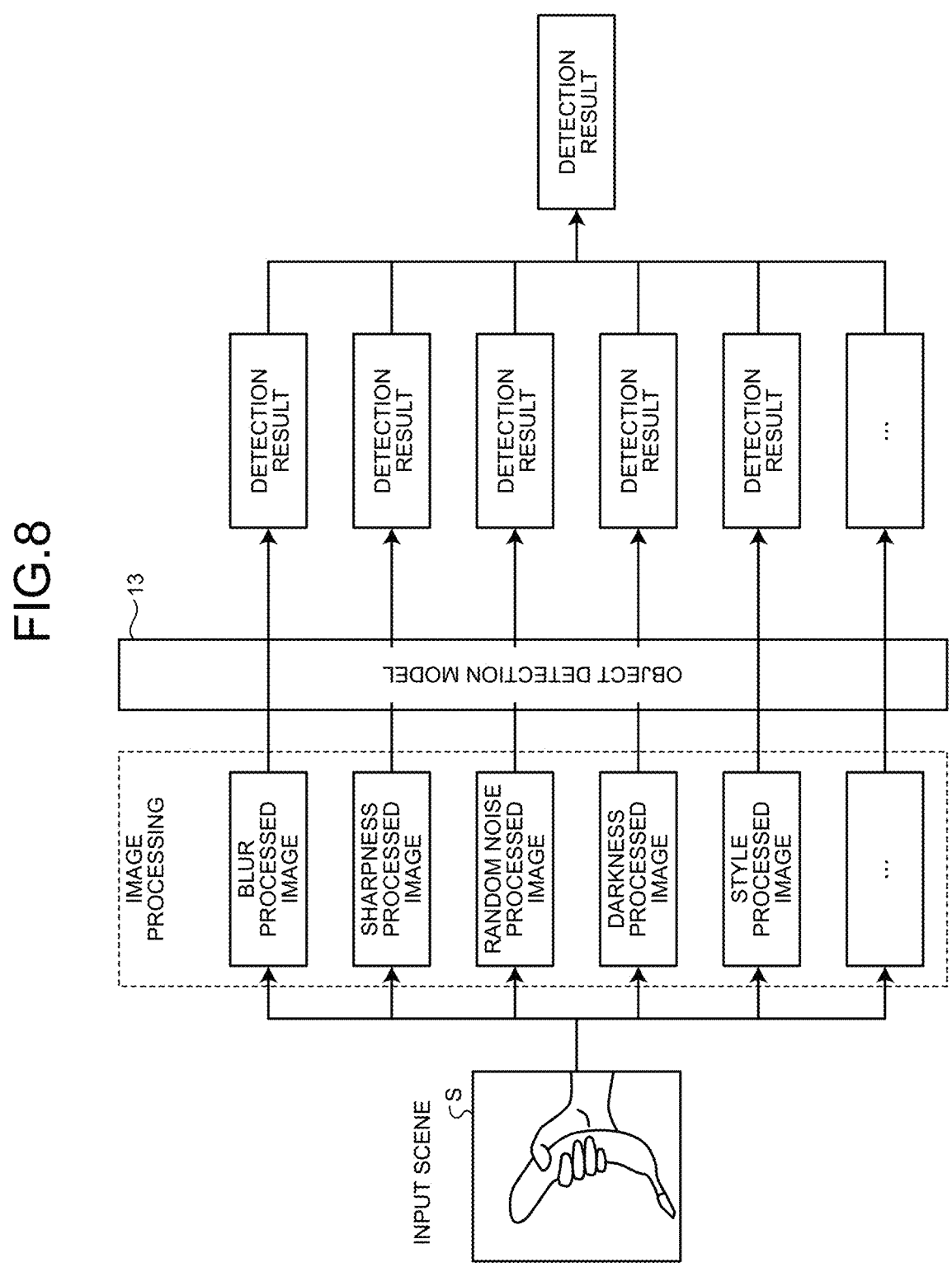
FIG. 8 is a diagram illustrating a SPD process.

FIG. 8 is a diagram illustrating the SPD process. As illustrated in FIG. 8, the SPD processing unit 24 performs a plurality of kinds of image processing on the input scene S, and generates a plurality of scenes. For example, the SPD processing unit 24 performs blur processing, and generates a blur processed image generates, by making the entire of the input scene S less sharp, a blurred image obtained just like at the time of a camera shake. The SPD processing unit 24 performs sharpness processing, and generates a sharpness processed image by performing edge enhancement on the object included in the input scene S. In addition, the SPD processing unit 24 performs random noise processing, and generates a random noise processed image by adding random noise to the input scene S. The SPD processing unit 24 performs darkness processing, and generates a darkness processed image by adding a dark image (for example, a dark frame in which only noise has been imaged over a long period of time, etc.) to the input scene S. In addition, the SPD processing unit 24 performs style conversion processing including arbitrary style transformation or the like, and generates a style processed image. For example, the SPD processing unit 24 generates a style processed image of the input scene S by using a network of arbitrary style transfer in which a content image is set in the input scene S and an auxiliary image is also set in the input scene S.

Subsequently, the SPD processing unit 24 inputs each of the plurality of scenes generated from the input scene S to the object detection model 13, and acquires the second classification result including the certainty factor of each of the trained objects. In other words, the SPD processing unit 24 acquires the second classification result with respect to the blur processed image, the second classification result with respect to the sharpness processed image, the second classification result with respect to the random noise processed image, the second classification result with respect to the darkness processed image, and the second classification result with respect to the style processed image.

After that, the SPD processing unit 24 aggregates each of the second classification results, and generates a SPD processing result. For example, the SPD processing unit 24 generates the SPD processing result based on a majority vote of each of the second classification results. Specifically, the SPD processing unit 24 counts the objects each having the highest certainty factor from among the second classification results, and selects the largest number of objects. In addition, the SPD processing unit 24 generates the SPD processing result on the basis of the total value of the certainty factors of the respective second classification results. Specifically, the SPD processing unit 24 calculates the total value of the certainty factors for each of the objects associated with the respective second classification results, and selects objects on the basis of the order of the total values of the certainty factors of the respective objects.

The patch detection unit 25 is a processing unit that detects whether an adversarial patch has been added to the input scene S on the basis of each of the processing results of the object detection process performed by the object detection unit 22, the OED process performed by the OED processing unit 23, and the SPD process performed by the SPD processing unit 24. Specifically, the patch detection unit 25 detects whether an adversarial patch has been added by using an arbitrary combination of each of the processing results, such as a combination of the object detection process and the OED process, a combination of the object detection process and the SPD process, or a combination of the object detection process, the OED process, and the SPD process, and by aggregating the combination results.

Figure 9:
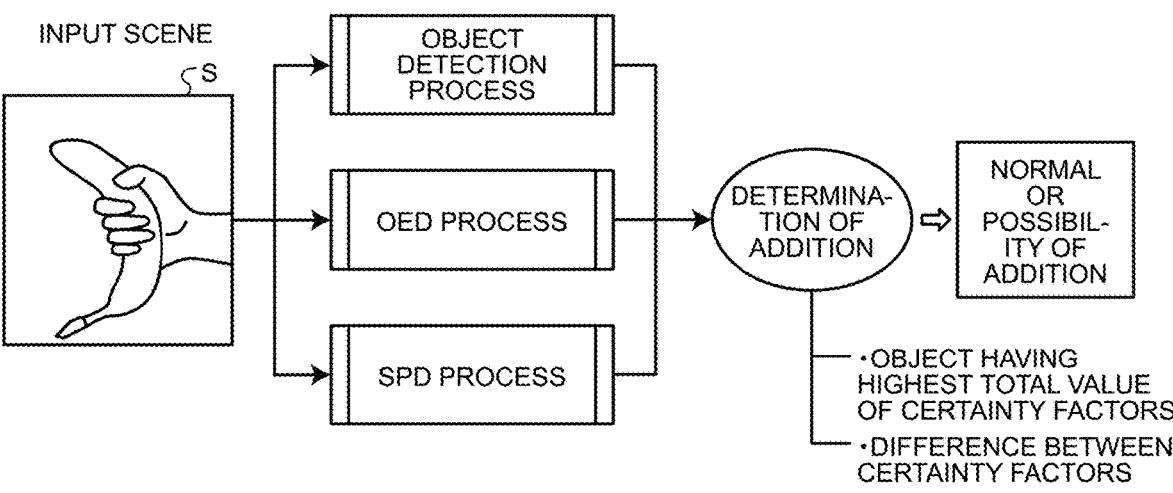
FIG. 9 is a diagram illustrating determination of an addition of an adversarial patch.

FIG. 9 is a diagram illustrating determination of an addition of an adversarial patch. As illustrated in FIG. 9, the patch detection unit 25 acquires the second classification result that is the result of the object detection process performed by the object detection unit 22, the first classification result that is the processing result obtained by the OED processing unit 23, and the second classification result of each of the scenes obtained by the SPD processing unit 24, and determine an addition of an adversarial patch on the basis of an aggregation result obtained by aggregating each of the results.

Specifically, the patch detection unit 25 detects an addition of an adversarial patch on the basis of the certainty factors of each of the processing results. For example, the patch detection unit 25 detects an addition of an adversarial patch by comparing the total value of the certainty factors of each of the first classification result obtained by the OED processing unit 23 and the second classification result obtained by the SPD processing unit 24 with the second classification result obtained by the object detection unit 22. For example, the patch detection unit 25 calculates, between the first classification result obtained by the OED processing unit 23 and the second classification result obtained by the SPD processing unit 24, the total value of the certainty factors of the object "banana", the total value of the certainty factors of the object "apple", and the total value of the certainty factors of the object "doughnut", and determines the object having the highest total value as the object extraction result. At this time, if the determined object and the object determined by the second classification result obtained by the object detection unit 22 are the same, the patch detection unit 25 determines that there is no possibility that an adversarial patch has been added (normal), and, if the determined object is different from the object determined by the second classification result, the patch detection unit 25 determines that there is a possibility that an adversarial patch has been added (abnormal).

In addition, the patch detection unit 25 is also able to an addition of the adversarial patch on the basis of a difference between the certainty factors. For example, the patch detection unit 25 specifies the object "banana (certainty factor $Y1$)" having the highest certainty factor from the second classification results obtained by the object detection unit 22. Then, the patch detection unit 25 acquires a certainty factor $Y2$ of the object "banana" from the first classification results obtained by the OED processing unit 23, and calculates an average value $Y3$ of the certainty factors of the object "banana" from among each of the second classification results obtained by the SPD processing unit 24. Then, the patch detection unit 25 determines that there is no possibility that an adversarial patch has been added (normal) in the case where a difference between the certainty factor $Y1$ and the certainty factor $Y2$ is less than the threshold and a difference between the certainty factor $Y1$ and the certainty factor $Y3$ is less than the threshold.

In addition, the patch detection unit 25 is also able to determine that there is a possibility that an adversarial patch has been added (abnormal) in the case where each of the processing results of the object detection process obtained by the object detection unit 22, the OED process obtained by the OED processing unit 23, and the SPD process obtained by the SPD processing unit 24.

Flow of Process

Figure 10:
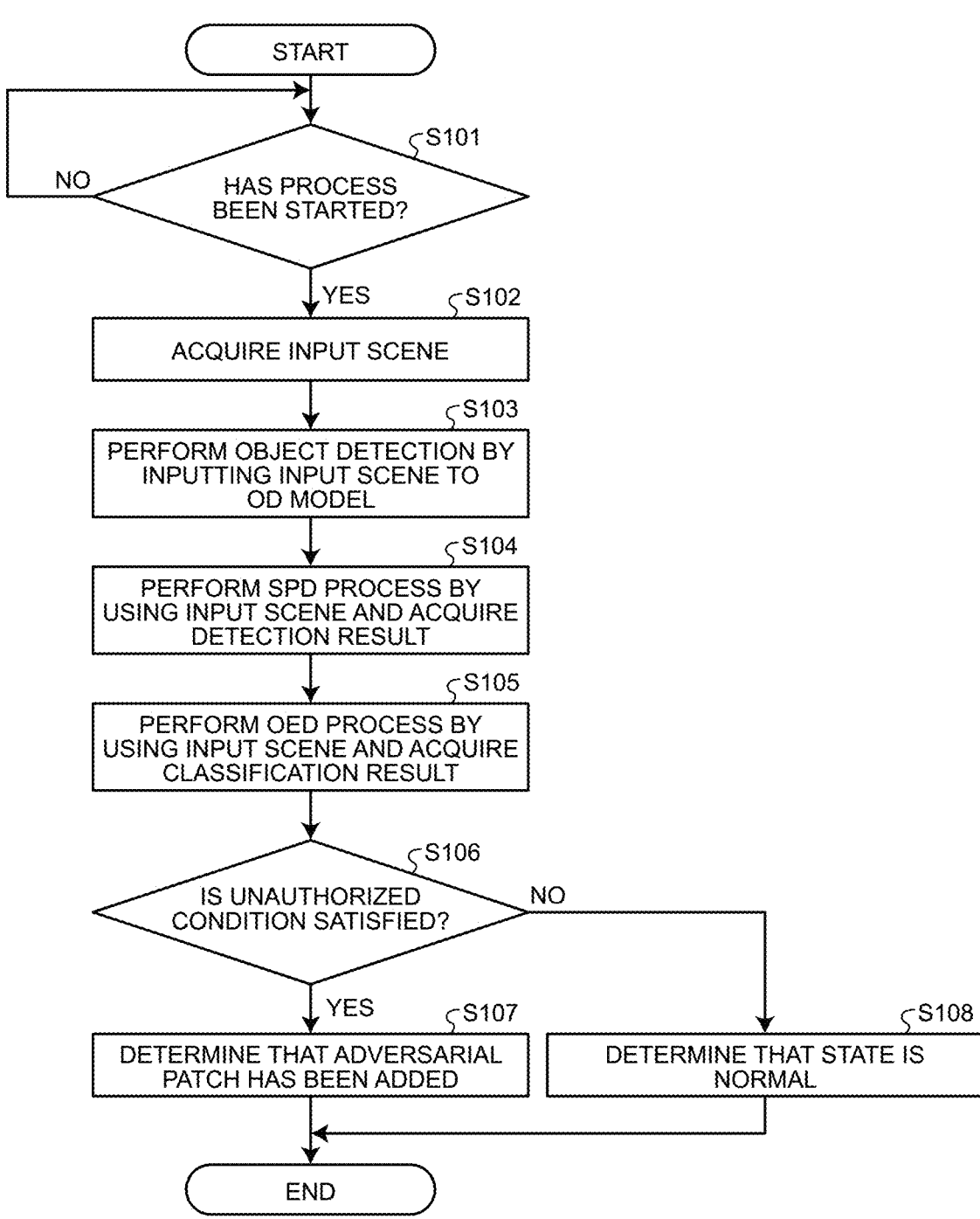
FIG. 10 is a flowchart illustrating the flow of an addition determination process.

FIG. 10 is a flowchart illustrating the flow of an addition determination process. As illustrated in FIG. 10, if the information processing apparatus 10 receives an instruction to start the process (Yes at Step S101), the information processing apparatus 10 acquires an input scene (Step S102), performs object detection by inputting the input scene to the object detection model 13, and acquires the first classification result (Step S103).

Subsequently, the information processing apparatus 10 performs the SPD process by using the input scene, and acquires each of the second classification processes corresponding to the detection results (Step S104). In addition, the information processing apparatus 10 performs the OED process by using the input scene, and acquires the first classification result corresponding to the classification result (Step S105).

Here, if an unauthorized condition that has been defined, in advance, on the basis of the information aggregated from each of the processing results is satisfied (Yes at Step S106), the information processing apparatus 10 determines that an adversarial patch has been added (Step S107), and, if the unauthorized condition is not satisfied (No at Step S106), the information processing apparatus 10 determines that the state is normal (Step S108).

Effects

As described above, the information processing apparatus 10 is able to detect an addition of an adversarial patch by using, in combination, the detection result obtained by the object detection model (OD model) 13, the OED processing result, and the SPD processing result without using an adversarial patch on the training data.

In addition, the information processing apparatus 10 is able to use, in arbitrary combination, the detection result obtained by the object detection model (OD model) 13, the OED processing result, and the SPD processing result, so that it is possible to select the combination in accordance with an environment, such as, in a case in which determination accuracy is emphasized, a combination of three results is used or, in a case in which a determination speed is emphasized, a combination of two results is used, and it is thus possible to implement a versatile detection process.

In addition, the information processing apparatus 10 converts the input scene to a plurality of scenes, and determines, by using the SPD process, whether an adversarial patch has been added. For example, an ordinary object is viewed as the same object without any change even if the scene is changed, many adversarial patches are uniquely used at the time of input and are conceivable to be vulnerable to the scene conversion. In such a case, particularly, the information processing apparatus 10 is able to improve the detection accuracy of an addition of an adversarial patch.

In addition, the information processing apparatus 10 performs the SPD process including a style conversion process by using the input scene S as an auxiliary image, so that the information processing apparatus 10 is able to acquire the classification result of the scene in which the input scene has been slightly changed. Therefore, the information processing apparatus 10 is able to acquire the classification result of the scene on the assumption that a situation has been slightly changed caused by an addition of an adversarial patch, so that the information processing apparatus 10 is able to improve the detection accuracy of the addition of the adversarial patch.

(b) Second Embodiment

In the above explanation, a description has been given of the embodiments according to the present invention; however, the present invention may also be implemented with various kinds of embodiments other than the embodiments described above.

Numerical Value, Etc.

The training data, the input scene, each of the objects, the values of the certainty factors, the content and the number of pieces of image processing, and the like used in the embodiment described above are only examples and may be arbitrarily changed. Furthermore, the flow of the processes described in each of the flowcharts may be changed as long as the processes do not conflict with each other. In addition, a model generated from various algorithms, such as a neural network, may be used for each of the models.

Processing Order

For example, the information processing apparatus 10 causes the OED processing unit 23 to be operated only in the case in which it is determined that a state is normal on the basis of the classification result obtained by the object detection unit 22 and the classification result obtained by the SPD processing unit 24. Then, the information processing apparatus 10 is also able to perform determination of an addition of an adversarial patch on the basis of the classification result obtained by the object detection unit 22 and the classification result obtained by the OED processing unit 23.

System

The flow of the processes, the control procedures, the specific names, and the information containing various kinds of data or parameters indicated in the above specification and drawings can be arbitrarily changed unless otherwise stated.

Furthermore, the specific shape of a separate or integrated unit included in each of the devices is not limited to the drawings. For example, the OED processing unit 23 and the SPD processing unit 24 may be integrated. In other words, all or part of the unit can be configured by functionally or physically separating or integrating any of the units in accordance with various loads or use conditions.

Furthermore, all or any part of each of the processing functions performed by each of the devices can be implemented by a CPU and by programs analyzed and executed by the CPU or implemented as hardware by wired logic.

Hardware

Figure 11:
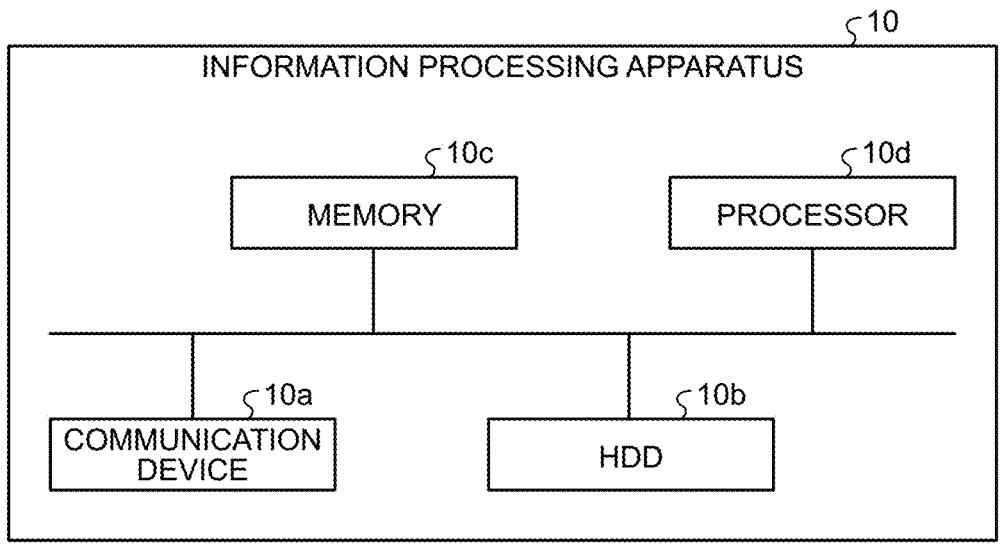
FIG. 11 is a diagram illustrating an example of a hardware configuration.

FIG. 11 is a diagram illustrating an example of a hardware configuration. Here, as an example, the information processing apparatus 10 will be described. As illustrated in FIG. 11, the information processing apparatus 10 includes a communication device 10a, a hard disk drive (HDD) 10b, a memory 10c, and a processor 10d. Furthermore, each of the units illustrated in FIG. 11 is connected each other via a bus or the like.

The communication device 10a is a network interface card or the like, and communicates with another device. The HDD 10b stores therein programs or the DBs that operate the function illustrated in FIG. 3.

The processor 10d operates the process that executes each of the functions described above in FIG. 3 or the like by reading the program that execute the same process as that performed by each of the processing units illustrated in FIG. 3 from the HDD 10b or the like and loading the read program in the memory 10c. For example, the process executes the same function as that performed by each of the processing units included in the information processing apparatus 10. Specifically, the processor 10d reads, from the HDD 10b or the like, the programs having the same functions as those performed by the acquisition unit 21, the object detection unit 22, the OED processing unit 23, the SPD processing unit 24, the patch detection unit 25, and the like. Then, the processor 10*d* executes the processes that execute the same processes as those performed by the acquisition unit 21, the object detection unit 22, the OED processing unit 23, the SPD processing unit 24, the patch detection unit 25, and the like.

In this way, the information processing apparatus 10 is operated as an information processing apparatus that performs an information processing method by reading and executing the programs. Furthermore, the information processing apparatus 10 is also able to implement the same functions as those described above in the embodiment by reading the above described programs from a recording medium by a medium reading device and executing the read programs. In addition, the programs described in another embodiment are not limited to be executed by the information processing apparatus 10. For example, the above described embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

REFERENCE SIGNS LIST

According to an aspect of an embodiment, it is possible to detect an adversarial patch without performing a training of the adversarial patch in advance.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a determination program that causes a computer to execute a process comprising:

extracting a projection area of an object by inputting an input scene containing a projection of the object to a predetermined projection area extraction model;

specifying each of second areas that are included in the extracted projection area of the object and that are similar to a plurality of first areas representing a feature of each of labels in a feature space;

outputting a first classification result by performing a first classification process for classifying the objects based on each of the plurality of labels indicating a state in which a distribution of combinations of the specified second areas and the first areas that are associated with the second areas is closer than a predetermined threshold; and determining whether or not an adversarial patch is included in the object by comparing the first classification result with respect to the input scene with a second classification result that is a result of classification of the objects obtained by inputting the input scene to a predetermined object detection model.

2. The non-transitory computer-readable recording medium according to claim 1, wherein the outputting further includes, generating a plurality of scenes by performing different kinds of image processing on the input scene, and performing a second classification process for classifying the objects included in the input scene based on a result obtained by classifying and aggregating the generated plurality of scenes by using the predetermined object detection model, wherein the determining includes outputting the first classification result based on a result of the first classification process and a result of the second classification process.

3. The non-transitory computer-readable recording medium according to claim 2, wherein the determining includes outputting the first classification result based on an aggregation result obtained by aggregating results of classification of each of the first classification process and the second classification process.

4. The non-transitory computer-readable recording medium according to claim 2, wherein the determining includes performing the second classification process before the first classification process, using, when both of the result of the second classification process and the second classification result satisfy a predetermined condition, the result of the second classification process as the first classification result, and performing, when the predetermined condition is not satisfied, the first classification process, and using the result of the first classification process as the first classification result.

5. The non-transitory computer-readable recording medium according to claim 2, wherein the outputting includes generating the plurality of scenes by using, as the different kinds of image processing, at least one of blur processing, sharpness processing, random noise processing, darkness processing, or style conversion processing or any combination thereof.

6. The non-transitory computer-readable recording medium according to claim 5, wherein, when the style conversion processing is performed, the outputting includes performing the style conversion processing by using the input scene as a designated image.

7. A determination method comprising:

extracting a projection area of an object by inputting an input scene containing a projection of the object to a predetermined projection area extraction model;

specifying each of second areas that are included in the extracted projection area of the object and that are similar to a plurality of first areas representing a feature of each of labels in a feature space;

outputting a first classification result by performing a first classification process for classifying the objects based on each of the plurality of labels indicating a state in which a distribution of combinations of the specified second areas and the first areas that are associated with the second areas is closer than a predetermined threshold; and determining whether or not an adversarial patch is included in the object by comparing the first classification result with respect to the input scene with a second classification result that is a result of classification of the objects obtained by inputting the input scene to a predetermined object detection model, using a processor.

8. An information processing apparatus comprising:

a memory; and a processor coupled to the memory and configured to:

extract a projection area of an object by inputting an input scene containing a projection of the object to a predetermined projection area extraction model;

specify each of second areas that are included in the extracted projection area of the object and that are similar to a plurality of first areas representing a feature of each of labels in a feature space;

output a first classification result by performing a first classification process for classifying the objects based on each of the plurality of labels indicating a state in which a distribution of combinations of the specified second areas and the first areas that are associated with the second areas is closer than a predetermined threshold; and determine whether or not an adversarial patch is included in the object by comparing the first classification result with respect to the input scene with a second classification result that is a result of classification of the objects obtained by inputting the input scene to a predetermined object detection model.

* * * * *